(12) United States Patent
McPherson et al.

(10) Patent No.: US 6,578,295 B1
(45) Date of Patent: Jun. 17, 2003

(54) FRONT END LOADER MULTIPLE TOOL ATTACHMENT APPARATUS

(75) Inventors: Mac E. McPherson, Jamestown, ND (US); Michael G. McPherson, Jamestown, ND (US); Gary A. Parkos, Browerville, MN (US); Roger D. Noska, Browerville, MN (US)

(73) Assignee: Glenmac Inc., Jamestown, ND (US)

( * ) Notice: Subject to any disclaimer, the term of this patent is extended or adjusted under 35 U.S.C. 154(b) by 0 days.

(21) Appl. No.: 09/871,157

(22) Filed: May 30, 2001

(51) Int. Cl.[7] .......................... E01H 6/00; A01B 59/048
(52) U.S. Cl. ............................. 37/403; 37/241; 172/273
(58) Field of Search .................... 37/403, 405, 406, 37/407, 468, 231, 241, 232, 233–235; 172/272, 273, 275, 445.2, 810, 811, 817, 820

(56) References Cited

U.S. PATENT DOCUMENTS

| | | | |
|---|---|---|---|
| 4,519,623 A | 5/1985 | Orthman | 280/461 |
| 4,585,075 A | 4/1986 | Mork | 172/197 |
| 4,930,801 A | 6/1990 | Gillund | 280/481 |
| 5,082,065 A | 1/1992 | Fletcher | 172/273 |
| 5,160,034 A | 11/1992 | Potter | 209/38 |
| 5,511,625 A | 4/1996 | Mork | 172/445.1 |
| 5,515,625 A | 5/1996 | Keigley | 37/405 |
| 5,590,731 A | 1/1997 | Jacobson | 180/53.4 |
| 5,666,794 A | 9/1997 | Vought et al. | 56/15.2 |
| 5,815,956 A * | 10/1998 | Lavin et al. | 37/241 |
| 6,016,584 A | 1/2000 | Melroe | 15/78 |
| 6,098,320 A | 8/2000 | Wass | 37/406 |

* cited by examiner

Primary Examiner—Robert E. Pezzuto
(74) Attorney, Agent, or Firm—Curtis V. Harr

(57) ABSTRACT

A frame apparatus that fits on the loader arms of a skid steer front loader. This frame apparatus serves as a platform upon which a plurality of hydraulically driven tools can be employed. The frame apparatus further includes a hydraulic junction box and solenoid system for multiplying the front loaders hydraulic ports.

16 Claims, 4 Drawing Sheets

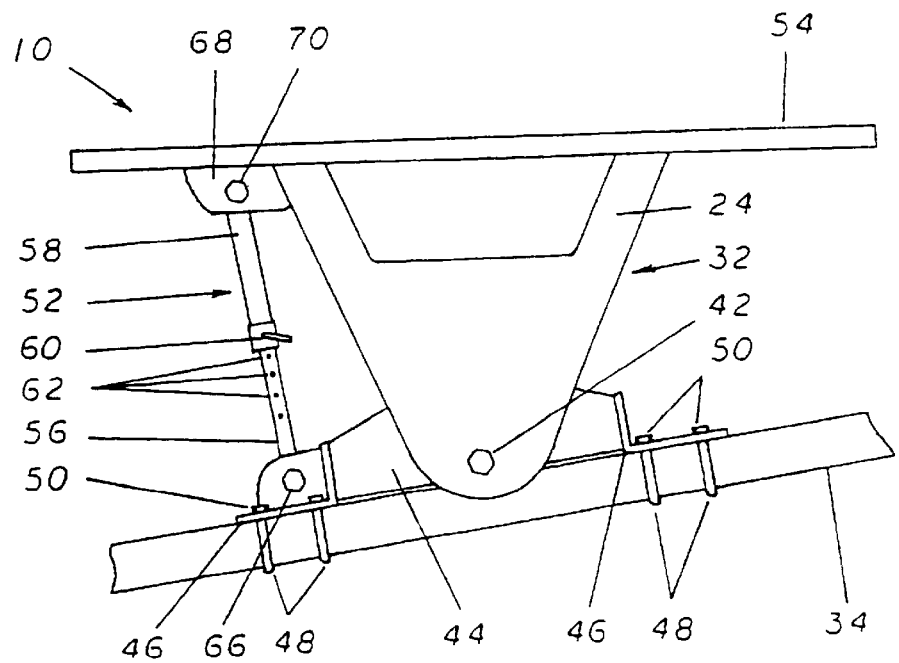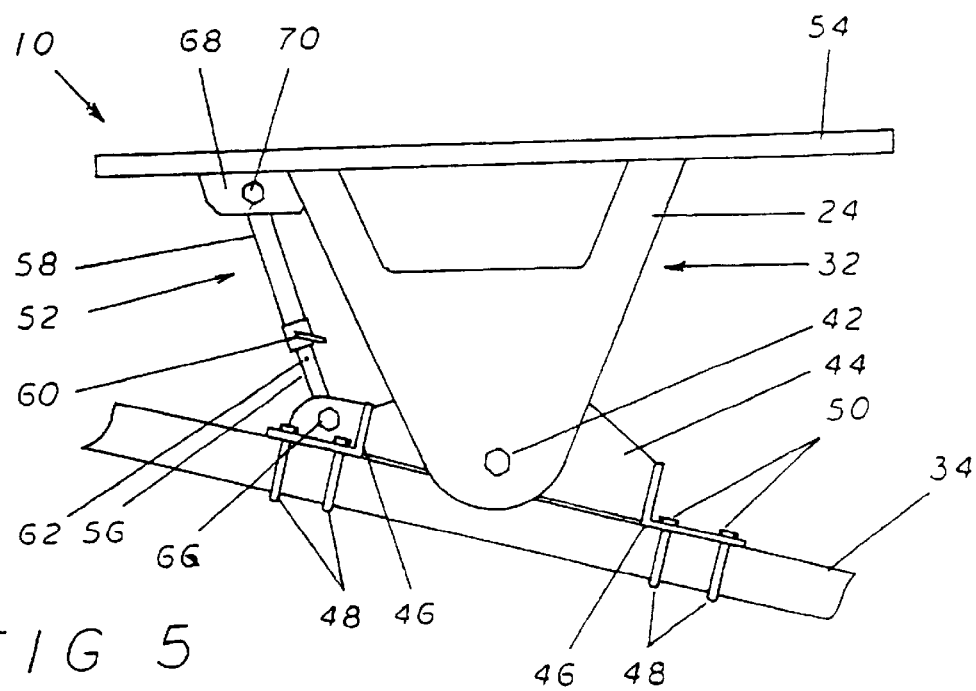

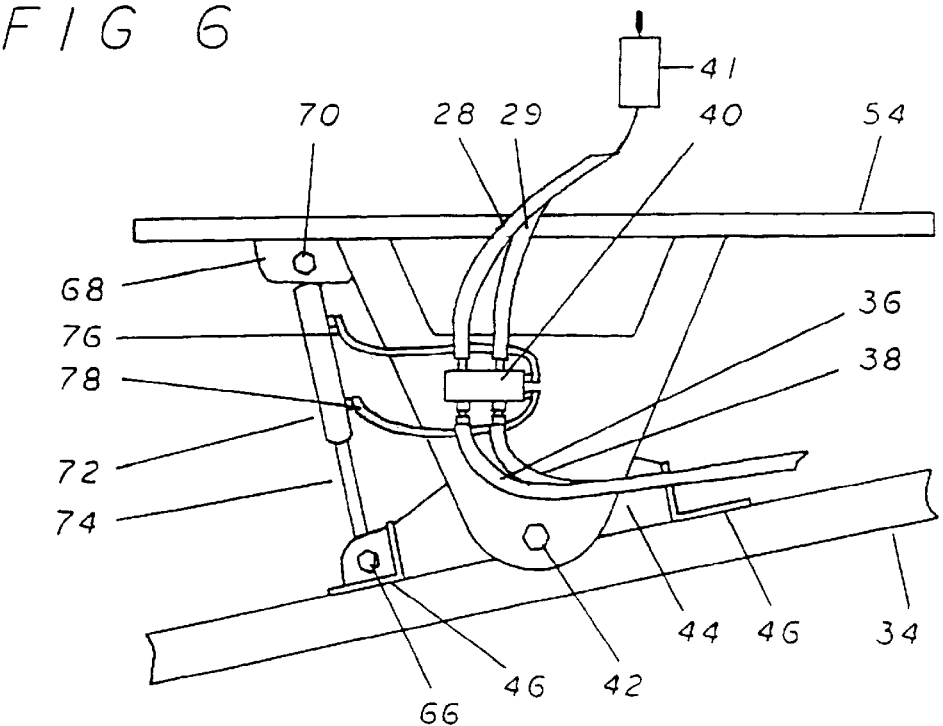

FRONT END LOADER MULTIPLE TOOL ATTACHMENT APPARATUS

BACKGROUND OF THE INVENTION

The present invention relates to front end loaders and attachment for front end loaders as used with utility tractors, and more specifically, to a front end loader attachment having multiple tools for use on skid steer loaders or other similar vehicles.

It has been known for some time to utilize various tools on skid steers. However, many tools require different control means and mounting brackets. As such, the cost of having several tools can be great. One method of reducing the cost of multiple tools is to provide a framework having a control means that may be used with various tools. This type of attachment framework has proven very efficient in many situations.

Of particular interest are attachments for skid steers for use in the landscaping and earth preparation industry. These attachments include rakes for preparing soil, brooms for sweeping, stump grinders, plow blades and the like. The various attachments are limited only by the ability of skid steers or front end loaders and a users needs.

One problem that has arisen when attaching multiple tools to a skid steer is the limited number of hydraulic ports on a typical skid steer. These ports may include control means for the front end loader and extra ports to run the tool. However, if various adjustments are needed to vary the angle or position of the tool and to operate various implements on the tool, extra hydraulic ports may be required that are not supplied on the original skid steer or front end loader. Further, as the typical bracket on a front end loader may only move up and down, various means of angling or adjusting attachments may also be required.

From this discussion it can be seen that it would be desirable to provide a structure for skid steer loaders. This structure would need to readily attach to the skid steer loader, have a means for controlling various hydraulic attachments and allow a user to multiply the number of hydraulic ports in an inexpensive and efficient manner.

This problem has been solved by supplying a multiple tool attachment apparatus having a pivotable tool attachment bar and a hydraulic junction box electrically controlled so as to multiply the number of hydraulic ports and allow for easy control by the user in the cab of the skid steer. This allows a maximum number of attachments to be used while keeping costs low by not duplicating control means and attachment means for each implement.

SUMMARY OF THE INVENTION

It is the primary objective of the present invention to provide a means of pivotally mounting a plurality of tools to the forward end of a front end loader to be used in a number of applications that would allow an individual to perform difficult tasks in a short period of time that would have normally required a larger number of people to complete.

It is an additional objective of the present invention to provide such a means that is configured in a manner that would allow an individual to easily change and secure the tools to the front end loader, thus, allowing him to accomplish a number of tasks without the aid of other people.

It is a further objective of the present invention to provide such a means that will allow an individual operator to manipulate the attached implement in a vertical manner that will allow him to place a varying degree of downward pressure on the implement which will translate on to the surface upon which the implement is working.

It is a still further objective of the present invention to provide such a means of enabling an individual to complete many types of complex jobs that is not only effective, but which also is inexpensive to own and operate.

These objectives are accomplished by the use of a frame apparatus that fits on the loader arms of a skid steer front end loader. The frame apparatus serves as a platform upon which a plurality of hydraulically or electrically driven implements can be employed to brush, scrape, or grind objects such as sidewalks and parking lots, fields, tree stumps, and any one of a multitude of other objects that require similar maintenance or surface preparation.

The hydraulically driven implements are designed in a manner that allows them to be easily installed on, and removed from, the frame apparatus. These instalment and removal procedures are facilitated by the use of implements which are equipped with a standardized implement bar which constitutes the rearmost surface of each implement. The implement bar is then complimented by the use of a U-bolt attachment device (or other quick-tach apparatus) that essentially clamps the implement bar to the pivoting attachment frame located at the most forward end of the present invention. This design ensures that not only a wide variety of implements can be used with the present invention but also enables the user to easily change from the use of one implement to another.

The present invention also employs a pivotal mounting system that is designed into the mechanisms that provide for the mounting of a plurality of implements to the forward portion of the present invention. This pivotal mounting system allows the angle of attack of the implement in relation to the front end loader's direction of travel to be varied depending upon the needs of the operator's objectives. Thus, for instance, an operator can choose to direct any debris that is accumulated in front of the operating implement to one side of the front end loader or the other. This provides for the increase of the implement's efficiency as it allows certain jobs to be adequately completed with only one pass of the front end loader and its attached implement.

This pivoting motion is controlled in one of either two ways. The first of these is a manually operated adjustment bar that spans the distance between the forward edge of the OEM base and the rearward edge of the implement bar on one side of the centrally located attachment base. The adjustment bar is capable of expanding and contracting and being locked into a desired length. The expansion of the adjustment bar forces one side of the implement bar away from the OEM base and the forward end of the front end loader which changes the angle of the attached implement in one direction. Conversely, when the adjustment bar is contracted the implement bar is drawn in on that side which changes the angle in the opposite manner.

The other manner in which the angle of attack of the attached implement is controlled by the design of the present invention is by the use of a hydraulic cylinder in the place of the manual adjustment bar. This method allows an operator to make adjustments in the orientation of the implement by using hydraulic pressure to expand and contract the hydraulic cylinder as necessary. The needed hydraulic pressure to operate this system is supplied by the front end loader's hydraulic system through the hydraulic coupling device which is to be discussed in greater detail below.

The hydraulic pressure needs of the present invention and any attached implements are facilitated by the use of a hydraulic junction box which allows the hydraulic system of the front end skid steer loader to be connected with any hydraulic system that the implement employs for its operation. The hydraulic junction box allows a user to attach the primary pressure and return lines from the skid steer to the quick release hydraulic ports on the forward surface of the junction box. The rearward surface of the junction box additionally has quick release secondary hydraulic ports which provide for a point of attachment for the implement's hydraulic lines.

Finally, the hydraulic junction box also contains an electrically activated solenoid which is used in conjunction with the hydraulically controlled adjustment cylinder to vary the angle of attack of attached implements. The use of the solenoid allows a small portion of the hydraulic pressure within the hydraulic junction box to be diverted to the hydraulic adjustment cylinder through the cylinder hydraulic lines which allows the operator of the front end loader to control the pivotal orientation of the attached implement from within the loader cab. Thus, the hydraulic junction box provides a mechanism that allows for the operation of the attached implement's hydraulic system, for the operation of a hydraulic adjustment cylinder, and a mechanism that allows for the easy changing of the implements attached to the present invention to match the requirements of the job at hand.

For a better understanding of the present invention, reference should be made to the drawings and the description in which there are illustrated and described preferred embodiments of the present invention.

DESCRIPTION OF THE DRAWINGS

FIG. 2 is a top elevation view of the present invention showing it as configured with an implement bar and illustrating the manner in which the hydraulic junction box allows the hydraulic system of the skid steer to be connected to the hydraulic system of any implement that the invention is equipped with.

FIG. 4 is a top elevation view of the present invention illustrating the manner in which adjustment bar is used to vary the angle of attack of the implement bar in one direction by extending the adjustment bar towards its maximum length and holding it there by the use of the adjustment arm pin and pin holes.

FIG. 5 is a top elevation view of the present invention illustrating the manner in which adjustment bar is used to vary the angle of attack of the implement bar in the opposite direction by retracting the adjustment bar towards its minimum length and holding it there by the use of the adjustment arm pin and pin holes.

FIG. 6 is a top elevation view of an alternative embodiment of the present invention which illustrates the use of a hydraulic cylinder for changing the angle of attack of the implement bar instead of the manual adjustment bar.

FIG. 7 is a front elevation view of the hydraulic junction box component of the present invention and illustrates its general manner of construction and the orientation of the primary hydraulic ports.

FIG. 8 is a rear elevation view of the hydraulic junction box component of the present invention and illustrates its general manner of construction and the orientation of the secondary hydraulic ports.

DESCRIPTION OF THE PREFERRED EMBODIMENT

Figure 1:
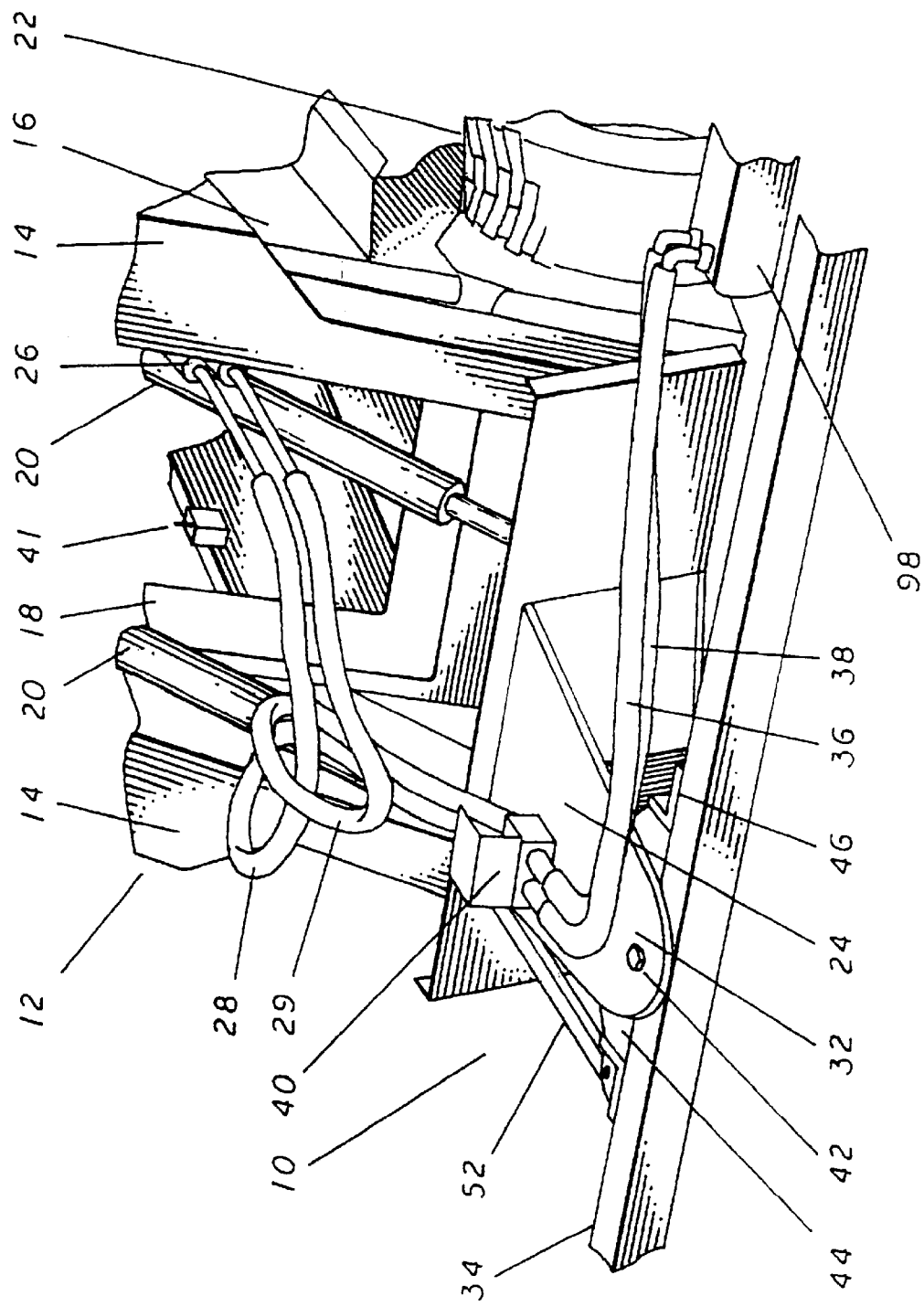
FIG. 1 is a perspective view of a typical skid steer loader being shown as equipped with the present invention which is configured with an implement bar being attached to the forward portion of the invention.

Referring now to the drawings, and more specifically to FIG. 1, the pivoting loader attachment frame 10 is an accessory item intended to be used in conjunction with front end skid steer loader 12. Front end skid steer loaders 12 are typically highly maneuverable motor driven vehicles used to pick up and transfer raw materials having skid steer wheels 22 and loader arms 14 which are driven and controlled through the use of the loader arm hydraulic cylinders 20. The front end skid steer loaders 12 also generally consist of a loader body 16 to which all of its components are attached and which also contains the loader cab 18 within which the operator sits during the use of the present invention.

The pivoting loader attachment frame 10 consists of the attachment base 32 which itself is primarily made up of the upper attachment plate 24 and the lower attachment plate 30. The attachment base 32 is fixed to the forward most portion of the loader arms 14 of the front end skid steer loader 12 by the use of the OEM base 54. This method of attachment of the present invention to front end skid steer loader 12 allows the operator to control the present invention and any of its plurality of attachments through the manipulation of the loader arms 14. Thus, the operator of the front end skid steer loader 12 can vary the down force placed on the present invention (which in turn varies the work force placed on the target surface) with only the effort of operating the hydraulic control and steering mechanisms which control the loader arms 14.

Figure 2:
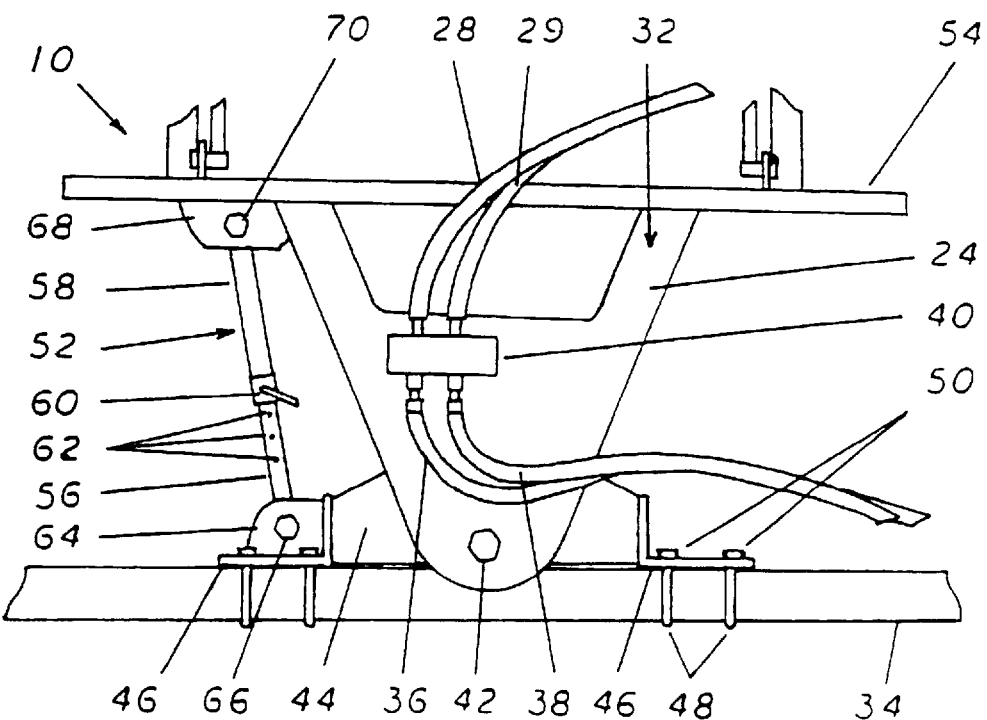
Figure 3:
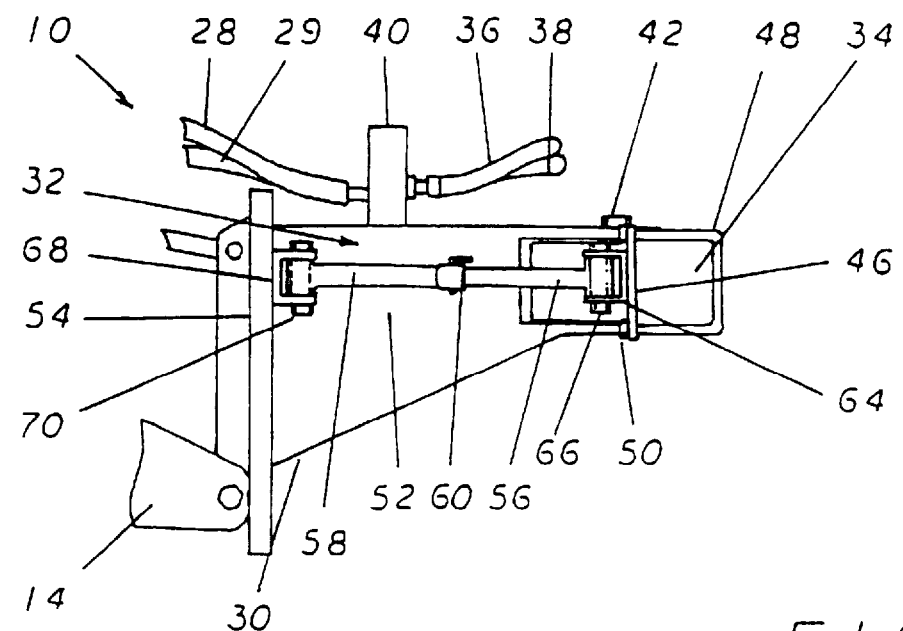
FIG. 3 is a side elevation view of the present invention showing it as configured with an implement bar and illustrating the configuration of the attachment frame and the OEM base that is used to attach the invention to the forward portion of a typical skid steer loader.

The hydraulic power needed to operate the plurality of implements that can be attached to the present invention is supplied by the front end skid steer loader 12 through the primary hydraulic assembly 26 located at the front of one of the loader arms 14. The manner in which this is accomplished is illustrated in FIGS. 2 and 3 which further detail the use of the primary hydraulic return line 28 and the primary hydraulic pressure line 29 to span the distance between the primary hydraulic assembly 26 at the front of the loader arms 14 and the hydraulic junction box 40 located on the upper surface of the upper attachment plate 24 of the attachment base 32. The hydraulic junction box 40 also provides the point of attachment for the secondary hydraulic return line 36 and the secondary hydraulic pressure line 38 which supply the actual hydraulic pressure to the individual implement's hydraulic box 98 that is necessary for their designed operation. Finally, the hydraulic system of the present invention is equipped with a hydraulic control switch 41 which is positioned in the loader cab 18 where it is generally held in place by the use of a magnetized surface that can bind to any number of surfaces within the loader cab 18. The hydraulic control switch 41 allows the operator of the front end skid steer loader 12 to control certain aspects of the invention's operation which will be more fully discussed in the text below.

The attachment base 32 itself is made up of the upper and lower attachment plates, 24 and 30, which form a forward extending triangular structure which is attached at its base to the OEM base 54. The most forward end of the attachment base 32 is constructed in a manner that allows for the pivotal attachment of the implement bar 34 which is the base upon which each of the employed implements is manufactured. This pivotal attachment is facilitated by the use of the pivoting attachment plate 44 which is fitted within the gap between the upper and lower attachment plates, 24 and 30, and is pivotally held there by the use of the central pivot bolt 42. The central pivot bolt 42 extends from the upper surface of the upper attachment plate 24, through the pivoting attachment plate 44 and out the lower surface of the lower attachment plate 30.

The pivoting attachment plate 44 is the component of the present invention which provides the method of attachment for a specific implement through the use of the implement bar 34. The implement bar 34 is a component that is common to all of the implements that are designed to be used with the invention and facilitates the attachment by horizontally spanning the most forward section of the invention. The attachment is made by placing the implement bar 34 against the outward surfaces of two implement attachment brackets 46 that are attached to either outside edge of the pivoting attachment plate 44. The actual attachment is made by passing a plurality of implement U-bolts 48 around the outside of the implement bar 34 and through the implement attachment brackets 46 where they are held in place buy the use of the U-bolt nuts 50. This method of attachment serves to clamp the implement bar 34, and therefore any accompanying implement, to the forward portion of the present invention which enables it to be used by the operator of the front end skid steer 12 in the desired manner.

The present invention also employs the use of an adjustment arm 52, the operation of which is detailed in FIGS. 4 and 5, which works in conjunction with the pivoting attachment plate 44 to allow the front end skid steer loader 12 to vary the angle of attack of the implement bar 34 in relation to the orientation of the present invention and the direction of travel of the front end skid steer loader 12. The adjustment arm 52 is made up of, in part, an inner adjustment arm 58 which is a hollow tubular devise that maybe square in its cross section and that is pivotally attached at its rearward end by the use of the inner bolt 70 to the inner bracket 68 and also which is open in its forward end providing access to its tubular interior.

The adjustment arm 52 also contains an outer adjustment arm 56 component which is generally a solid bar that may also be square in its cross section and has an outside dimension that is slightly smaller than the inside dimension of the inner adjustment arm 58. This configuration allows the outer adjustment arm 56 to slide in and out of the inner adjustment arm 58 to vary the length of the adjustment arm 52 as a whole. The forward end of the inner adjustment arm 58 also contains the arm pin 60 which operates in conjunction with a plurality of adjustment holes 62 that pass through the body of the outer adjustment arm 56 to hold the adjustment arm 52 at the desired length.

Additionally, the outer adjustment arm 56 is pivotally attached to the pivoting attachment plate 44 at the outer bracket 64 by the use of the outer bolt 66. This configuration allows the operator to vary the distance that the adjustment arm 52 spans which in turn will either draw in or push away one end of the implement bar 34 from the corresponding side of the forward end of the invention. This pivoting action allows the implement's angle of attack to be changed from tilted to one side of the front end skid steer loader's 12 direction of travel, to square in this relationship, or all the way tilted to the opposite side. Thus, the operator can vary the orientation of the implement through he manipulation of the adjustment arm 52 to any one of a plurality of positions depending upon the requirements of the job being performed.

An alternative embodiment of the present invention is illustrated in FIG. 6 in which a hydraulic adjustment cylinder 72 is used in place of the manually operated adjustment arm 52. The hydraulic adjustment cylinder 72 is pivotally attached to the other components of the present invention at its forward end at the outer bracket 64 and at it rearward end at the inner bracket 68 by the use of the outer and inner bolts, 66 and 70 in much the same manner as the adjustment arm 52. In this embodiment of the invention, the activation of the hydraulic adjustment cylinder 72 is used to change the angle of attack of the attached implement. This activation causes the cylinder rod 74 either expand in relation to the body of the hydraulic adjustment cylinder 72 or to contract which in turn changes the distance between the body of the invention and the implement bar 34.

The control and activation of the hydraulic adjustment cylinder 72 is provided through the hydraulic control switch 41 which is an electrical device that allows a small portion of the hydraulic pressure provided by the front end skid steer loader 12 within the hydraulic junction box 40 to be diverted to the hydraulic adjustment cylinder 72. This diversion occurs through the cylinder pressure line 76 which spans the distance between the hydraulic adjustment cylinder 72 and the hydraulic junction box 40 and allows the operator to expand the hydraulic adjustment cylinder 72 through the use of the hydraulic control switch 41. The cylinder return line 78 completes the circuit by returning hydraulic fluid from the hydraulic adjustment cylinder 72 to the hydraulic junction box 40. This embodiment of the present invention allows the operator to control the position of the attached implement without leaving the loader cab 18, thus, making the use of the present invention more user friendly than the previous embodiment.

The manner in which the hydraulic junction box 40 is constructed is further detailed in FIGS. 7 and 8 which illustrate the general configuration of the hydraulic junction box 40 and the orientation of its components. The upper portion of the box body 80 is covered by the box cover 86 which protects the hydraulic junction box 40 from potentially damaging impacts. This protection function of the box cover 86 is especially important in terms of the hydraulic solenoid 92 (the component of the hydraulic junction box 40 that actually controls the diversion of hydraulic pressure to the hydraulic adjustment cylinder 72) which in part extends above the upper surface of the box body 80. Therefore, the use of the box cover 86 ensures that no object will come into contact with the hydraulic solenoid 92 which could potentially damage it and effect the overall performance of the invention.

The primary purpose of the hydraulic junction box 40 is to provide a means by which the hydraulic system of the front end skid steer loader 12 can be quickly and easily connected with the hydraulic systems of the plurality of implements that can be attached by the use of the present invention. The connections involved in the attachment of the hydraulic system of the front end skid steer loader 12 to the invention are facilitated by the primary pressure and return line ports, 82 and 84, which are located in the rearward oriented face of the box body 80 and allow for the connection of the primary hydraulic pressure and return lines, 29 and 28. The connections involved in attaching the implement's hydraulic to the hydraulic junction box 40 are facilitated by the secondary pressure and return line ports, 94 and 96, which are located in the forward oriented face of the box body 80 and allow for the connection of the secondary hydraulic pressure and return lines, 38 and 36. Finally, the connections involved in attaching the hydraulic adjustment cylinder's 72 hydraulic system to the hydraulic junction box 40 are facilitated by the cylinder pressure and return line ports, 88 and 90, which are located on the outward surface of the box body 80 and allow for the connection of the cylinder pressure and return lines, 76 and 78.

Although the present invention has been described in considerable detail with reference to certain preferred versions thereof, other versions are possible. For example, the type of tractor used may vary greatly. Therefore, the spirit and scope of the appended claims should not be limited to the description of the preferred versions contained herein.

What is claimed is:

1. A multiple tool attachment for use on a front end loader having a first and second loader arm and a hydraulic system said attachment comprising:

a base having a generally flat front surface and a rear surface adapted for attachment to said first and second loader arms so as to span the distance between said first and second loader arms on said front end loader;

an attachment plate having a forward and rearward end said rearward end being fixedly attached to said bases front surface such that said attachment plate extends perpendicularly outward from said base in a fixed position;

a pivot point at said forward end of said attachment plate;

an implement bar pivotally attached to said pivot point; and an adjustment means having a first and second end with said first end pivotally attached to said base and said second end pivotally attached to said implement bar such that said adjustment means may be used to adjust the position of said implement bar relative to said base.

2. A multiple tool attachment as in claim 1 further comprising a hydraulic junction box mounted to said multiple tool attachment for connecting said hydraulic system of said front end loader with said multiple tool attachment.

3. A multiple tool attachment as in claim 2 wherein said adjustment means is a manually adjustable arm have multiple length settings.

4. A multiple tool attachment as in claim 2 wherein said adjustment means is a hydraulic cylinder attached to said junction box.

5. A multiple tool attachment as in claim 4 wherein said hydraulic junction box further comprises:

a first and second port for attaching a hydraulically operated tool;

a first and second port for operating said hydraulic cylinder; and a solenoid for switching control between said hydraulically operated tool and said hydraulic cylinder.

6. A multiple tool attachment as in claim 5 further comprising a control switch mounted to said solenoid.

7. A hydraulically adjustable multiple tool attachment for use on a front end loader said attachment comprising:

a base having a generally flat front surface and a rear surface adapted for attachment to said first and second loader arms so as to span the distance between said first and second loader arms on said front end loader;

an attachment plate having a forward and rearward end said rearward end being fixedly attached to said bases front surface such that said attachment plate extends perpendicularly outward from said base in a fixed position;

a pivot point at said forward end of said attachment plate;

an implement bar pivotally attached to said pivot point;

a hydraulic junction box mounted to said multiple tool attachment said junction box having a first and second primary port for attaching said junction box to the hydraulic system of said front end loader, a first and second secondary port and a first and second cylinder port; and a hydraulic cylinder attached to said first and second cylinder port on said hydraulic junction box, said cylinder having a first and second end with said first end pivotally attached to said base and said second end pivotally attached to said implement bar such that said cylinder may be used to adjust the position of said implement bar relative to said base.

8. A hydraulically adjustable multiple tool attachment as in claim 7 further comprising a solenoid for controlling the flow of fluid to said first and second cylinder port.

9. A hydraulically adjustable multiple tool attachment as in claim 8 further comprising a switch for controlling said solenoid.

10. A hydraulically adjustable multiple tool attachment as in claim 9 further comprising a magnet for removable mounting said switch to said front end loader.

11. A hydraulically adjustable multiple tool attachments as in claim 10 further comprising a plurality of U-bolts for mounting implements to said implement bar.

12. A hydraulically adjustable multiple tool attachment for use on a front end loader said attachment comprising:

a base having a generally flat front surface and a rear surface adapted for attachment to said first and second loader arms so as to span the distance between said first and second loader arms on said front end loader;

an attachment plate having a forward and rearward end said rearward end being fixedly attached to said bases front surface such that said attachment plate extends perpendicularly outward from said base in a fixed position;

a pivot point at said forward end of said attachment plate;

an implement bar pivotally attached to said pivot point such that said implement bar may pivot in a horizontal plane in relation to said base plate;

a means of attaching various implements to said implement bar;

a hydraulic junction box mounted to said multiple tool attachment said junction box having a first and second primary port for attaching said junction box to the hydraulic system of said front end loader, a first and second secondary port and a first and second cylinder port; and a hydraulic cylinder attached to said first and second cylinder port on said hydraulic junction box, said cylinder having a first and second end with said first end pivotally attached to said base and said second end pivotally attached to said implement bar such that said cylinder may be used to adjust the position of said implement bar relative to said base.

13. A hydraulically adjustable multiple tool attachment as in claim 12 further comprising a solenoid for controlling the flow of fluid to said first and second cylinder port.

14. A hydraulically adjustable multiple tool attachment as in claim 13 further comprising a switch for controlling said solenoid.

15. A hydraulically adjustable multiple tool attachment as in claim 14 further comprising a magnet for removable mounting said switch to said front end loader.

16. A hydraulically adjustable multiple tool attachment as in claim 15 wherein said means of attaching various implements to said implement bar is a plurality of U-bolts.

\* \* \* \* \*